United States Patent
Guha

(10) Patent No.: US 9,027,337 B2
(45) Date of Patent: May 12, 2015

(54) MULTIPLE VARIABLE PEDALING FORCE ENERGY SUMMATOR

(76) Inventor: Prabal Kumar Guha, Florence, SC (US)

( * ) Notice: Subject to any disclaimer, the term of this patent is extended or adjusted under 35 U.S.C. 154(b) by 674 days.

(21) Appl. No.: 13/134,529

(22) Filed: Jun. 9, 2011

(65) Prior Publication Data

US 2012/0240568 A1    Sep. 27, 2012

Related U.S. Application Data

(60) Provisional application No. 61/397,392, filed on Jun. 11, 2010.

(51) Int. Cl.
*F15B 11/064*    (2006.01)
(52) U.S. Cl.
CPC .................................. *F15B 11/064* (2013.01)
(58) Field of Classification Search
CPC ................... F15B 11/064; F15B 2211/20584; B60K 3/02; F01B 17/02; F01L 15/00
USPC ............ 60/398, 411, 412, 413; 92/20, 15, 22; 417/429, 426, 316; 91/344
See application file for complete search history.

(56) References Cited

U.S. PATENT DOCUMENTS

| | | | | |
|---|---|---|---|---|
| 1,527,226 A | * | 2/1925 | Rollins | 92/23 |
| 2,337,831 A | * | 12/1943 | McGovern | 417/238 |
| 3,697,764 A | * | 10/1972 | Stanziola et al. | 290/42 |
| 4,334,839 A | * | 6/1982 | Flagg | 417/536 |
| 4,902,206 A | * | 2/1990 | Nakazawa et al. | 417/394 |

FOREIGN PATENT DOCUMENTS

GB    306901    *  5/1929

* cited by examiner

*Primary Examiner* — Nathaniel Wiehe
*Assistant Examiner* — Abiy Teka
(74) *Attorney, Agent, or Firm* — Conley Rose, P.C.; Rodney B. Carroll

(57) ABSTRACT

The present invention relates to a system for adding energy comprising a plurality of pedaling devices wherein each pedaling device being configured: to receive a force in up and down directions and allow for the flow of compressed air from the corresponding pedaling device to an air storage tank, wherein connection of the air storage tank to the pedaling devices allows storing of the compressed air and the summing of the energy generated by each pedaling device. Each pedaling device comprises, a plurality of air compression cylinders and pistons for generating air pressure; wherein the pistons are provided with an escapement device.

12 Claims, 4 Drawing Sheets

MULTIPLE VARIABLE PEDALING FORCE ENERGY SUMMATOR

CROSS REFERENCE TO RELATED US APPLICATION

The present invention claims priority from U.S. provisional patent application No. 61/397,392 dated 11 Jun. 2010, which is hereby incorporated herein by reference its entirety for all purposes.

FIELD OF THE INVENTION

The present invention relates to a system which adds energy produced by more than one pedaling devices which individually generate energy. More particularly, it relates to a system which does not restrict the pedaling forces applied to each pedaling device. Even more particularly, it relates to a system, wherein the energy generated by the pedaling devices is summated substantially correctly not only under conditions when the forces applied to the pedaling devices are different, but also under the conditions when the rate of energy produced by the multiple pedaling devices is different. Additionally, the energy storage is pneumatic in form and the stored energy can be used to drive various equipments including but not limited to bicycles; rickshaws; and automobiles and other drives.

PRIOR ART

Summation of pedaling energy is achieved in tandem bicycles for multiple users by having the chain to go around the sprockets driven by each user. This system has the limitation that each user needs to apply equal force at all times, because when the force application is unequal, the load shifts primarily to the user giving the highest force and the inputs from the others are minimal. Also, there are devices which store energy in pneumatic chambers into which air is pumped in by the pedaling action of users. The major limitation of such system is that the pneumatic chamber pressure rises to the level of the pressure developed by the most forceful user, and therefore, other users with lower force capability are, thereafter, not able to pump the energy into the pneumatic chamber. Thus, such system becomes a single user system suitable only for the highest force input user.

NEED FOR THE INVENTION

Therefore, there is a need for a system which permits multiple users to store energy in a storage device not only under the conditions when the pedaling forces applied are markedly different, but also under the conditions when rate of energy produced by multiple pedaling devices is different. Such systems are required for equipments including but not limited to multiple user bicycles; multiple user boats where a part of the drive energy is provided by the users; and in transport vehicles including but not limited to rickshaws and passenger buses.

AIMS AND OBJECTS OF THE INVENTION

The main object of the present invention is to provide a system for adding the energy produced by more than one pedaling devices, wherein pedaling force applied to each pedaling device to generate energy is not restricted, and wherein the energy generated by the pedaling devices is summated substantially correctly not only under conditions when the forces applied to the pedaling devices are different, but also under the conditions when the rate of energy produced by the multiple pedaling devices is different.

The main object of the present invention is to provide a system for adding the energy produced by more than one pedaling devices, wherein the energy stored is pneumatic in form and can be used to drive various equipments including but not limited to bicycles; rickshaws; and automobiles and other drives.

Other objects and advantages of the present invention will become more apparent when following description is read in conjunction with the accompanying figures, which are incorporated for the purpose of illustrations and are not intended to limit scope of the invention claimed.

BRIEF DESCRIPTION OF THE ACCOMPANYING FIGURES

It may be noted that the accompanying figures are not to the scale.

BRIEF DESCRIPTION OF THE INVENTION

Figure 1:
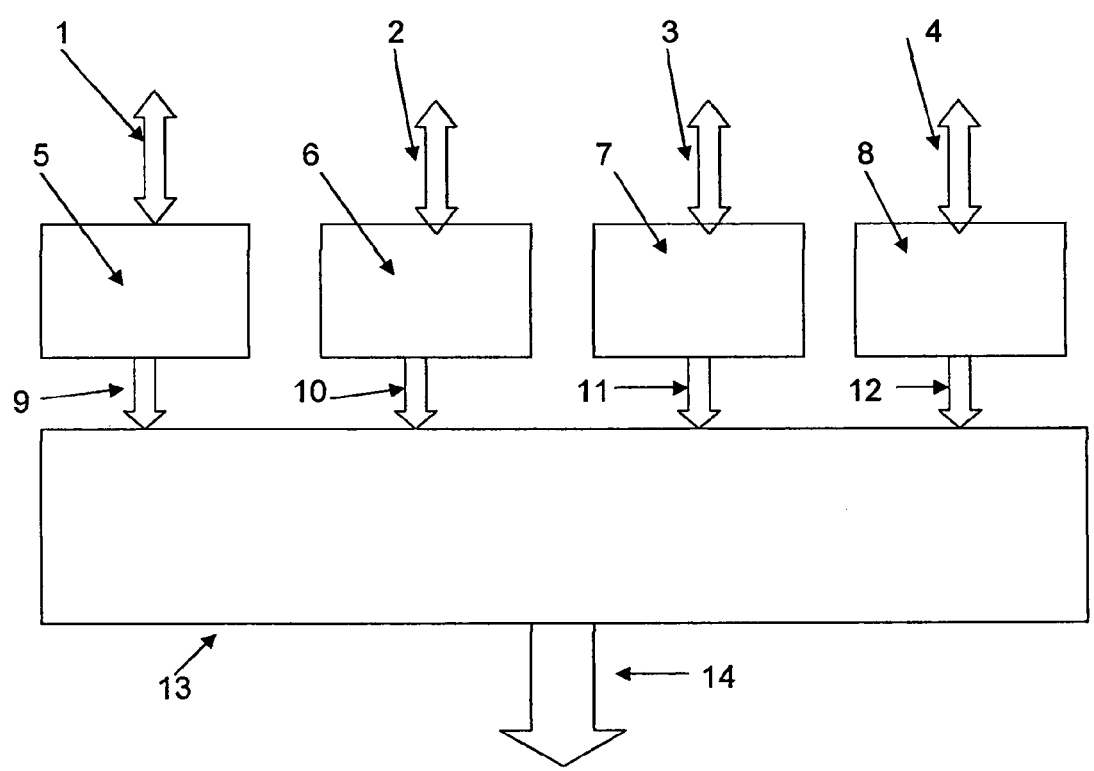
FIG. 1 and FIG. 1A illustrates a system comprising more than one pedaling devices in accordance with preferred embodiments of the present invention.

Accordingly, the present invention relates to a system for adding the energy produced by more than one pedaling devices, wherein pedaling force applied to each pedaling device to generate energy is not restricted, and wherein the energy generated by the pedaling devices is summated substantially correctly not only under conditions when the forces applied to the pedaling devices are different, but also under the conditions when the rate of energy produced by the multiple pedaling devices is different comprising more than one pedaling device, wherein each pedaling device is provided with means for applying the force to pedaling device in up and down directions, and means for flow of compressed air from pedaling device to air storage tank, and an air storage tank, wherein the air storage tank is connected to pedaling devices through means for flow of compressed air for storing the compressed air meaning thereby for summing or storing the energy generated by each pedaling device, wherein pedaling device comprises at least one set of cylinder and piston for generating the air pressure.

In present invention, the terms pedaling device and pedaling unit are used interchangeably to define one and same component of the system of present invention.

DETAILED DESCRIPTION AND PREFERRED EMBODIMENTS OF THE INVENTION

The present invention is now described with the help of accompanying figures, which as stated above are not intended to limit scope of present invention.

The present invention relates to a system for adding the energy produced by more than one pedaling devices, wherein pedaling force applied to each pedaling device to generate energy is not restricted, and wherein the energy generated by the pedaling devices is summated substantially correctly not only under conditions when the forces applied to the pedaling devices are different, but also under the conditions when the rate of energy produced by the multiple pedaling devices is different comprising more than one pedaling devices 5, 6, 7, 8, wherein each pedaling device 5, 6, 7, 8 is provided with means 1, 2, 3, 4 for applying the force to pedaling device 5, 6, 7, 8 in up and down directions, and means 9, 10, 11, 12 for flow of compressed air from pedaling device 5, 6, 7, 8 to air storage tank 13, and an air storage tank 13, wherein the air storage tank 13 is connected to pedaling devices 5, 6, 7, 8 through means 9, 10, 11, 12 for flow of compressed air for storing the compressed air meaning thereby for summing or storing the energy generated by each pedaling device 5, 6, 7, 8, wherein each pedaling device 5, 6, 7, 8 comprises at least one set of cylinder 15, 16, 17 and piston 18, 19, 20 for generating the air pressure.

In accordance with one of the embodiments of the present invention, the pedaling device 5 is connected to air storage tank 13 through a means 9 for flow of compressed air from pedaling device 5 to the air storage tank 13. In similar manner, other pedaling devices 6, 7, 8 are connected to air storage tank 13 through respective means 10, 11, 12 for flow of compressed air from corresponding pedaling device 6, 7, 8 to the air storage tank 13.

In accordance with another preferred embodiment of the present invention, the pedaling device 5 comprises at least one set of cylinder 15 and piston 18 and is connected to air storage tank 13 through a means 24 for flow of compressed air from cylinder 18 to air storage tank 13.

In accordance with yet another preferred embodiment of the present invention, the pedaling device 5, 6, 7, 8 comprises at least one set of cylinders 15, 16, 17 and pistons 18, 19, 20, wherein each cylinder 15, 16, 17 is connected to air storage tank 13 through a respective means 24, 25, 26 for flow of compressed air from pedaling device 5, 6, 7, 8 to air storage tank 13.

It may be further noted that in accordance with still another preferred embodiment of the present invention, the pedaling device 5 comprising more than one set of cylinders 15, 16, 17 and pistons 18, 19, 20 is connected to air storage tank 13 through respective means 24, 25, 26 for flow of compressed air from corresponding cylinder 15, 16, 17 to air storage tank 13.

Figure 2:
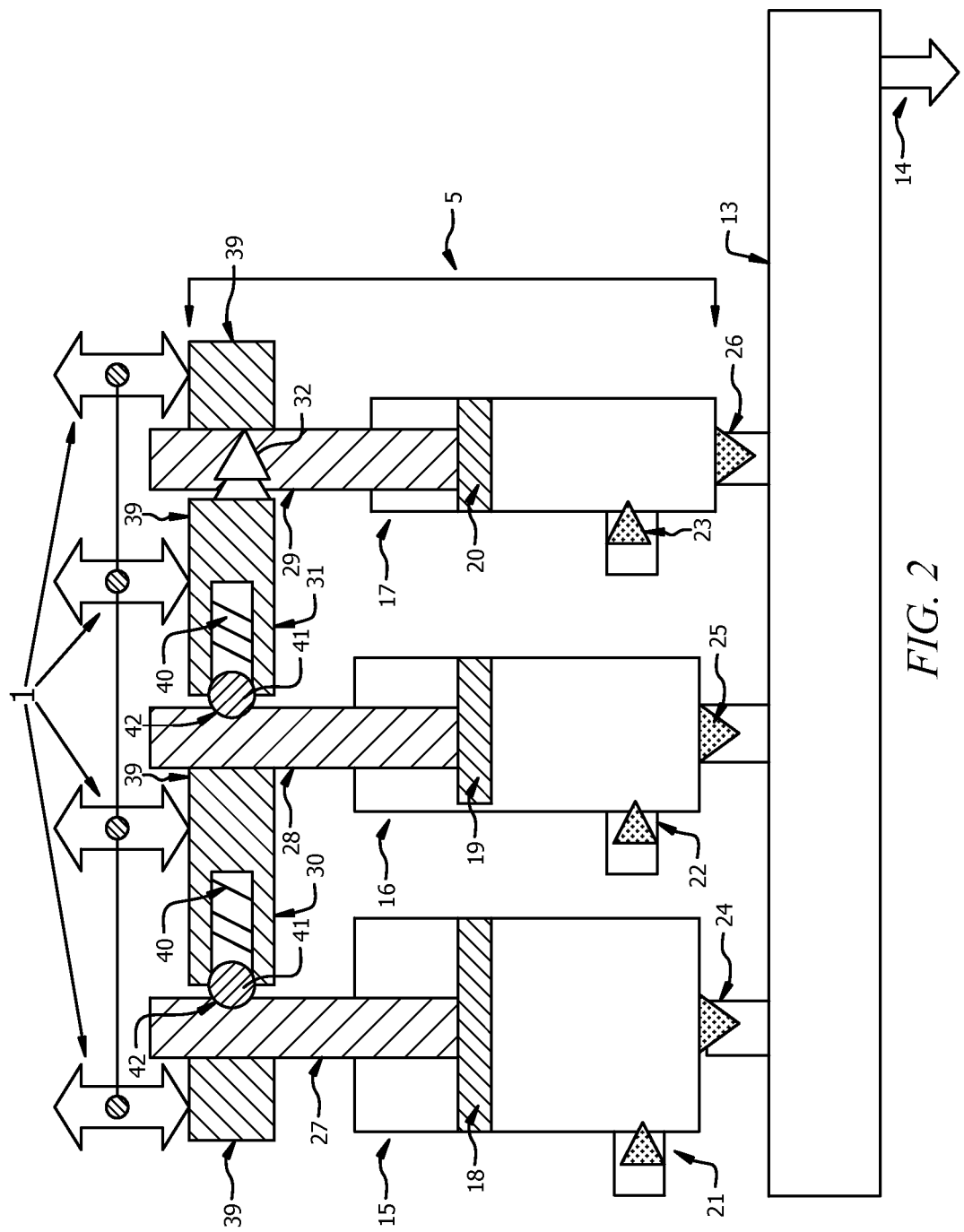
FIG. 2 illustrates constructional features of one of the pedaling devices of the system of FIG. 1 in accordance with one of the preferred embodiments of the present invention.

Accordingly, it is clarified that means 9 for flow of compressed air from pedaling device 5 to the air storage tank 13 [FIG. 1] is same as means 24 for flow of compressed air from cylinder 15 to air storage tank 13 [FIG. 2]. Similarly, means 9 for flow of compressed air from pedaling device 5 to the air storage tank 13 [FIG. 1] is same as means 25, 26 for flow of compressed air from cylinder 16, 17 to air storage tank 13 [FIG. 2].

In accordance with preferred embodiment of the present invention, the pedaling device 5 comprises more than one set of cylinders 15, 16, 17 and pistons 18, 19, 20, wherein each cylinder is connected to air storage tank 13 through respective means 24, 25, 26 for flow of compressed air from corresponding cylinder 15, 16, 17 to air storage tank 13.

In accordance with present invention, the air storage tank 13 is common for all pedaling devices 5, 6, 7, 8.

In accordance with present invention, the piston 18, 19, 20 is provided with piston rod 27, 28, 29, wherein the piston rod 27 and 28 are provided with respective escapement device 30 and 31, and piston rod 29 is connected to piston rod 28 through escapement device 31 which is also provided with a locking means 32.

It may be noted that escapement device 30 for piston rod 27 and escapement device 31 for piston rod 28 are embedded in a thick plate 39, and each consist of compression spring 40 which presses a ball 41 provided therein into the groove 42 provided within the piston rod 27, 28. The escapement device 31 when there are set of three cylinders 15, 16, 17 and pistons 18, 19, 20 is provided with a locking means 32, which structurally interconnects the adjacent piston rod 28 and 29. In the alternate the escapement device 30, when there are set of two cylinders 15, 16 and pistons 18, 19 is provided with a locking means 32, which structurally interconnects the adjacent piston rod 27 and 28 as in this embodiment there will not be any piston rod 29 and corresponding escapement device 31.

In accordance with present invention, the air compression cylinder 15, 16, 17 is provided with one way valve 21, 22, 23 for sucking the air inside the cylinder.

In accordance with present invention, the means 24, 25, 26 for flow of compressed air from corresponding cylinder 15, 16, 17 to air storage tank 13 comprise one way valve.

Figure 1A:
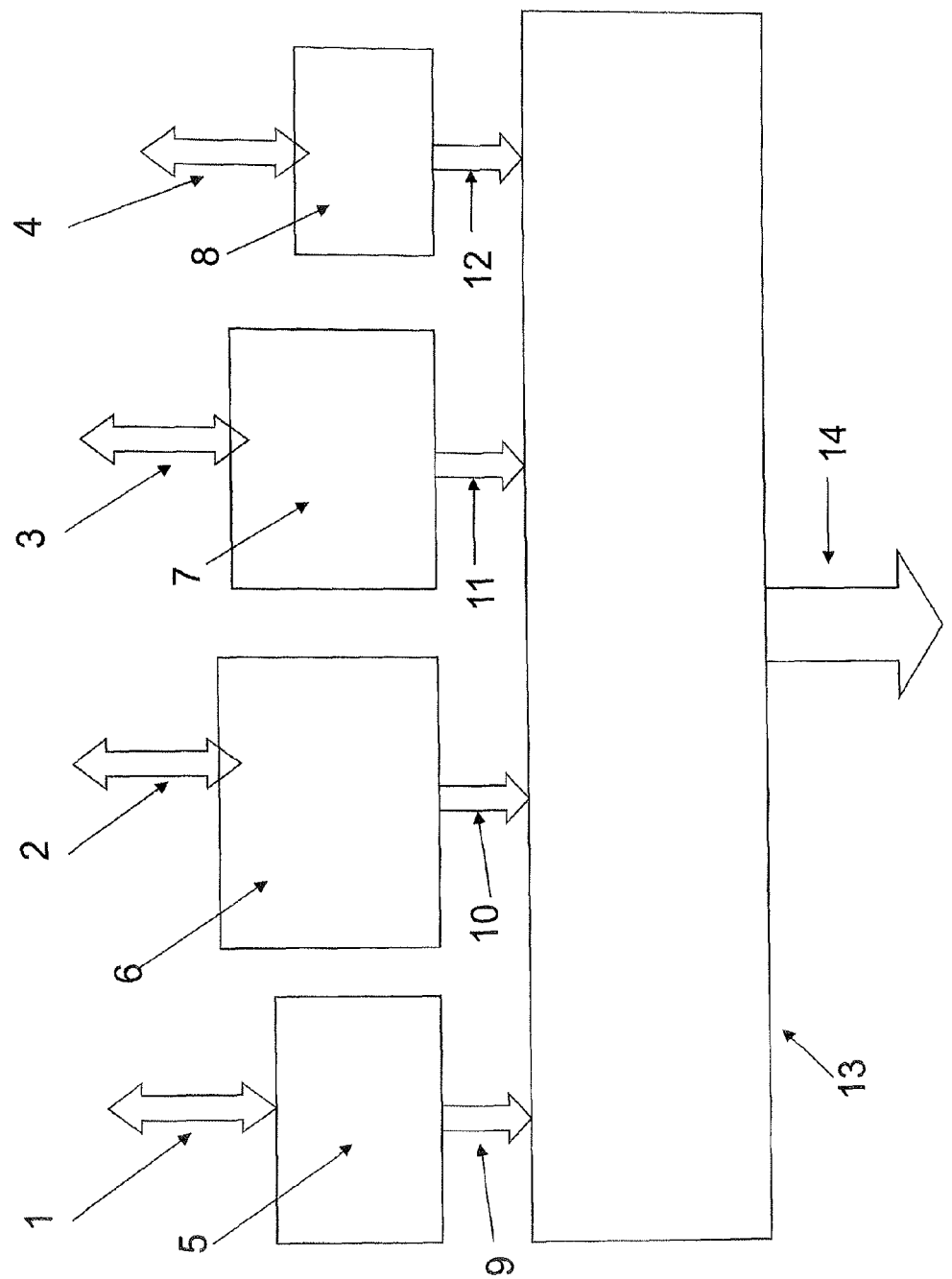

In accordance with present invention, the pedaling units 5, 6, 7 and 8 may be identical (FIG. 1) or different (FIG. 1A) in size and dimensions from each other, and hence, may comprise same and identical set of cylinders and pistons.

The functioning of present system will be more apparent from the following description when read in conjunction with accompanying figures, which are not intended to limit scope of present invention.

Now referring to the accompanying drawings, the features and operation of the system of the present invention are as follows:

The system as shown in FIG. 1 comprises, for example, four pedaling units 5, 6, 7 and 8. As it is understood from the foregoing description, the system may comprise more or less numbers of pedaling units, but at least one pedaling unit. To each pedaling unit of FIG. 1, up and down pedaling force is given by an user through means 1, 2, 3, 4 (e.g., pedals) for applying the force to pedaling device 5, 6, 7, 8 in up and down directions. The pedaling forces thus applied generate compressed air within the pedaling unit. From each pedaling unit the compressed air generated is pumped into the air storage tank 13 through means 9, 10, 11, 12 (e.g., conduits) for flow of compressed air from pedaling device 5, 6, 7, 8 to air storage tank 13. Thus the potential energy developed in the air in each pedaling unit is transferred to the air storage tank 13 where the energy is summated or stored. From the air storage tank the compressed air flows out through a means 14 into the external drive unit (not shown in figure) to drive that device. In accordance with present invention, the devices which can be derived by compressed air flowing from air storage tank of the system of present invention include but not limited to bicycle; boat; passenger bus; and any type of machine operatable by energy in the form of compressed air. It may be noted that instead of air other hydraulic media can also be used in the system of the present invention.

FIG. 2 shows constructional details of one of the pedaling units 5. The pedaling unit 5 is provided with at least one set of cylinder and piston, and as illustrated in FIG. 2, it is provided with three numbers of air compression cylinders 15, 16, 17 and corresponding pistons 18, 19, 20. It may be noted that, in the figure a pedaling unit with three air compression cylinders is shown but the number of air compression cylinders in a single pedaling unit could be more or less, preferably it should be at least two sets of cylinders and pistons. The air compression cylinders in a single pedaling unit are, preferably, of different diameters, and therefore, of different cross-sectional area so that persons with different strength and power can use the system of present invention. For a certain force applied to the piston of an air compression cylinder the pressure of air is given by the force divided by the cross-sectional area. Thus, for a certain force the pressure developed will be more in the air compression cylinder with small cross-sectional area. Therefore, a person with more power can use cylinder having highest diameter, and a person with less power can use cylinder having lowest diameter. It may also be noted that in FIG. 2, the cylinder with highest diameter is shown on left side of the figure and cylinder with lowest diameter is shown in extreme right side of the figure. However, scope of present invention is not restricted by such an arrangement. All the pedaling force drives a thick plate comprising the escapement devices 30, 31 and the locking means 32.

For further understanding of its operation, consider the operation beginning from the state wherein the air storage tank 13 has air at atmospheric pressure, that is, there is no potential energy stored in tank 13. The grip of the escapement devices 30, 31 are set to the maximum force that can be exerted by an user. When the pedaling motion is such that the thick plate along with the escapement devices 30, 31 and locking means 32 move upwards a partial vacuum is created in the air compression cylinder spaces below the pistons. On account of the partial vacuum air is sucked into the air compression cylinders through the one way valves 21, 22, 23. Next the pedaling force pushes the thick plate with the escapement devices and locking means downwards. Since the air storage tank is at atmospheric pressure compressed air from all the air compression cylinders will flow into the air storage tank via the means 24, 25, 26 comprising one way valves. The escapement devices will remain in the "engaged" position because the upward reaction force of the piston rods 27, 28, 29 will be minimal. The cycle of upward and downward motion of the thick plate with the escapement devices and locking means will go on in steps with more air flowing into the air storage tank 13 and the pressure inside the air storage tank rises. The reaction force of the piston rods will increase and the user will encounter greater resistance to pedaling. A stage will come when the reaction becomes equal to the maximum force [previously set] that can be exerted by the user. The piston reaction force is the air pressure inside the air compression cylinder multiplied by the cross-sectional area. Therefore the larger diameter air compression cylinder will have the higher piston reaction force. Therefore first the escapement device with the largest air compression cylinder will slip. At this stage, the large air compression cylinder in effect is deactivated. The resistance to pedaling will fall and the user can continue to pedal and the smaller cylinders which generate higher pressure on account of the smaller cross-sectional area will drive air into the air storage tank. With further rise in pressure in the air storage tank the reaction force on piston rod 28 too will become high and the escapement device 31 will slip thereby inactivating the air compression cylinder 18. The air compression cylinder 17 remains active on account of the locking means 32. Accordingly, in accordance with preferred embodiment of the present invention a pedaling device having set of more than one cylinders, of which one is provided with a locking means and other is without a locking means but is provided with an escapement device is preferred. The pressure generated is high on account of small cross-sectional area. The user can therefore pedal and pump in small amounts of air into the air storage tank in each pedal cycle. Since there will be drain from the air storage tank to the operation of the small area air compression cylinder can go on as long as the user desires to pedal. The engagement force of the escapement devices can be adjusted during operation by turning a screw (not shown in the figure) which alters the force exerted by the spring in the escapement device.

Going back to FIG. 1 which shows four pedaling units each operated by an individual user it may be noted that the operation of one pedaling unit does not restrict operation of the others. The air compression cylinders in each of the pedaling unit will disengage depending upon the force exerted by the individual user. The user exerting greater force will pump in more and the user exerting less force will pump in less but at equal pressure because the smaller area air compression cylinders generate more pressure for the same force. All the air pumped into the air storage tank leads to a summation of energy, meaning thereby to storage of energy. Therefore, there is summation or storage of energy in spite of differing pedaling forces by different users. In this manner the need expressed is met.

Figure 3:
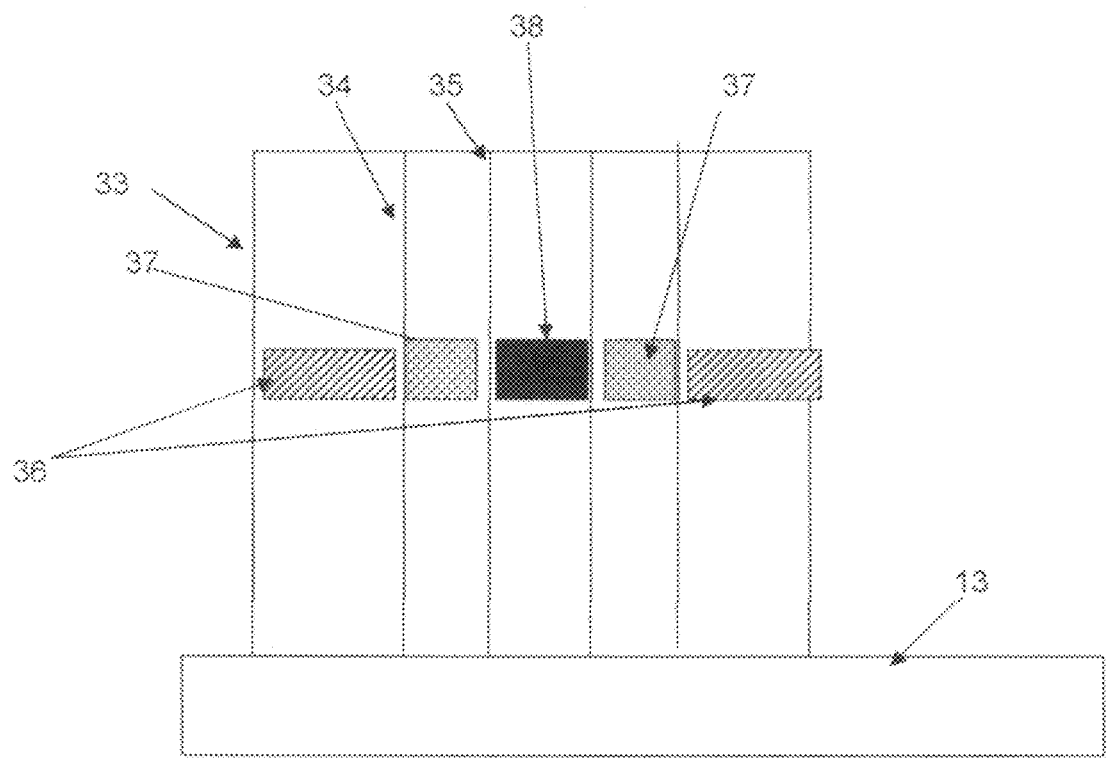
FIG. 3 illustrates constructional features of one of the pedaling devices of the system of FIG. 1 in accordance with another preferred embodiment of the present invention.

It may be noted that the system of present invention has been shown with air compression cylinders are arranged side by side. In one embodiment of the present invention, concentric configuration of the air compression cylinders as illustrated in the accompanying FIG. 3 is employed. The smallest cross-sectional area compression cylinder 38 is at the centre. The next larger cross-sectional area cylinder 36 surrounds the compression cylinder 38 in annular form. The still greater cross-sectional area compression cylinder 34 surrounds the compression cylinder 35 in annular for. The central cylinder has a circular piston. The next larger piston has piston 37 which is in annular form. The largest compression cylinder 33 has an annular piston 36. The escapement mechanisms not shown in the diagram are fixed in the same manner as in FIG. 2. The number of compression cylinders may be two or more.

In accordance with another embodiment of the present invention, the configuration with bellow type chambers is employed.

It may be noted that basic operation remains the same for all these configurations.

It may be noted that present system has been described as manual in operation. However, in embodiment, the operation of the present system may be automatic. The use of stored energy in windmill is good example of such system, which is included within the scope of present invention.

The invention claimed is:
1. A system for adding energy comprising a plurality of pedaling devices wherein each of the pedaling devices is provided with:
   a) means for applying force to the respective (or corresponding) pedaling device in up and down directions, and
   b) means for flow of compressed air from the respective (or corresponding) pedaling device to an air storage tank,
      wherein connection of the air storage tank to the pedaling devices with the respective (or corresponding) means for flow of compressed air allows for the storing of the compressed air and the summing of the energy generated by each pedaling device;
      wherein each of the pedaling devices comprises a plurality of air compression cylinders and pistons for generating air pressure;
      wherein said piston is provided with an escapement device;
      wherein the escapement device is provided in a plate;
      wherein said escapement device is provided with a locking means to interconnect piston rods;
      wherein the pedaling device drives the plate comprising the escapement device and the locking means;
      wherein said escapement device comprises a compression spring to press a ball provided therein into a groove provided within said piston rod; and wherein the ball has a proximal end and a distal end, the proximal end is in contact with the piston rod, the distal end is in contact with the spring, and the proximal end is operative to be pressed out of the piston groove against the reactive force of the spring when the pressure inside the air storage tank exceeds a predetermined threshold.

2. A system as claimed in claim 1, wherein said pedaling device is connected to the air storage tank through a means for flow of compressed air from said cylinder to said air storage tank.

3. A system as claimed in claim 1, wherein said pedaling device comprises two or more sets of the cylinders and the pistons, wherein said each cylinder is connected to the air storage tank through respective means for flow of compressed air from the corresponding cylinder to the air storage tank.

4. A system as claimed in claim 1, wherein said piston is provided with a corresponding piston rod.

5. A system as claimed in claim 1, wherein the respective escapement device is provided onto said piston rod, and the piston rod is connected to another piston rod through the escapement device.

6. A system as claimed in claim 1, wherein said air compression cylinder is provided with corresponding one way valve to suck air inside the cylinder.

7. A system as claimed in claim 1, wherein said means for flow of the compressed air from the corresponding cylinder to the air storage tank comprise one way valve.

8. A system as claimed in claim 1, wherein said pedaling devices are identical in size and dimensions.

9. A system as claimed in claim 1, wherein said pedaling devices are different in size and dimensions.

10. A system as claimed in claim 1, wherein said air compression cylinders are arranged side by side.

11. A system as claimed in claim 1, wherein said air compression cylinders are arranged in concentric configuration.

12. A system as claimed in claim 1, wherein said air compression cylinders are bellow type chambers.

* * * * *